J. T. CROWLEY.
APPARATUS FOR AND PROCESS OF THE MANUFACTURE OF RUBBER FOOTWEAR.
APPLICATION FILED MAR. 21, 1913.
1,122,078.
Patented Dec. 22, 1914.
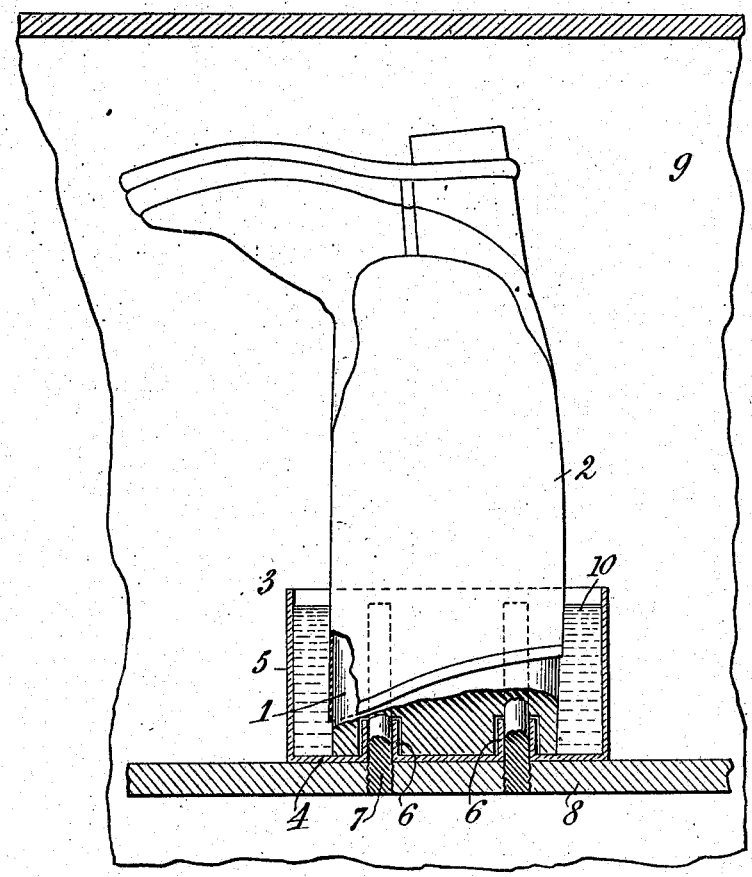
WITNESSES:
INVENTOR
John T. Crowley,
By Attorneys,

UNITED STATES PATENT OFFICE.

JOHN T. CROWLEY, OF BEACON FALLS, CONNECTICUT, ASSIGNOR TO THE BEACON FALLS RUBBER SHOE COMPANY, OF BEACON FALLS, CONNECTICUT, A CORPORATION OF CONNECTICUT.

APPARATUS FOR AND PROCESS OF THE MANUFACTURE OF RUBBER FOOTWEAR.

1,122,078.    Specification of Letters Patent.    Patented Dec. 22, 1914.

Application filed March 21, 1913. Serial No. 755,932.

*To all whom it may concern:*

Be it known that I, JOHN T. CROWLEY, a citizen of the United States, residing in Beacon Falls, in the county of New Haven and State of Connecticut, have invented certain new and useful Improvements in Apparatus for and Process of the Manufacture of Rubber Footwear, of which the following is a specification.

This invention relates to the manufacture of rubber footwear, and has for an object to provide a method of and device for keeping dry the linings of rubber boots and shoes during steam vulcanization thereof.

For a long period rubber boots and shoes have been vulcanized while upon wooden lasts or forms. Owing to the action of the wood when subjected to heat and moisture it was found preferable to carry on the vulcanization by a dry or hot air process. Until quite recently metallic forms or lasts were prohibitive in price. With the advent, however, of a practicable method of making metallic lasts, recourse has been had to the steam curing or vulcanization of rubber footwear. At times, during the process of steam vulcanization moisture appears between the article and the last, which moisture is liable to stain the lining, most of these articles being provided with fabric lining of some description. It is not known exactly at what time the moisture finds access between the article and the last: probably shortly after the admission of steam to the vulcanizing chamber and before the articles, the lasts and whatever air may be in the chamber and within the article under treatment, have reached such a temperature that the moisture of the steam will not condense. Some workers have tried to prevent this condensation by applying the expedient common in other branches of rubber manufacture of hermetically sealing the open end of the article under treatment to the last, to thereby prevent the entrance of the vulcanizing medium to the interior of the article. This method has been found undesirable owing to the fact that whatever air is between the article and the form will not readily escape during the preliminary heating up which takes place upon the first entrance of the vulcanizing medium to the chamber. In some cases the expansion of the air, gas or vapor within the boot or shoe will deform and injure the latter, or the gas, air or vapor may force its way out past the seal or dam and thus make a channel by which moisture can gain access to the interior. By my improvement, however, the vulcanizing medium is permitted to enter freely within the article under treatment and to find access thereto between its inner surface and the mold or last. But to prevent the injurious and unsightly discoloration of the lining incident to the condensation of moisture, that portion of the vulcanizing medium which is admitted to the interior, or which is admitted between the form and the article, is freed from moisture. For accomplishing this a filter or absorbent is applied to the open end of the article in such a position that it will readily permit the exit of air or gas from within the article, and will as readily permit the entrance of the vulcanizing medium, but will filter from it all moisture.

In the drawing accompanying this specification one practicable device for practising the invention is illustrated, wherein the device is shown in vertical section and a boot, partly broken away to show the last, is illustrated in position in a vulcanizer.

In this drawing there is shown a commercial form of metallic last 1, upon which is a rubber boot 2. The last is provided with pin holes at its end, that is, the end which is at the upper or open end of the boot but which, according to the present practice of vulcanization will be the lower end as the device stands in the vulcanization chamber. The moisture filter is illustrated at 3, and in the present showing comprises a cup having a bottom 4 and side walls 5. In the bottom 4 are provided a pair of thimbles 6 which receive the pins 7 of the rack 8, which is located within the vulcanizing chamber 9. These pins and thimbles are for entrance into the holes at the end of the last for supporting the last and boot in an upright position in the vulcanizing chamber. The sides of the cup are sufficiently high so as to extend beyond the top or open end of the boot when this is in position. After the boot and last have been placed in position upon the cup and this upon the rack, powdered soapstone 10 will be placed in the cup in such quantity that it will extend above the open end of the boot and present a filter so that whatever moisture may be entrained or form a part of the vulcanizing medium will be filtered from such medium and prevented from entering the boot. The dry gas, however, will freely pass into the boot and whatever gas or air may be within the boot may, upon expansion or by reason of pressure upon the leg of the boot, pass out through the filter.

Although but one form of carrying out the invention has been illustrated and but one filter or filtering material specifically mentioned, yet it will be apparent that changes may be made within the scope of the claims without departing from the spirit of the invention.

I claim as my invention:—

1. That improvement in the art of steam curing rubber boots and shoes which consists in placing the same upon lasts, placing a moisture filter at the open end of the article and then vulcanizing the said articles by steam.

2. The method of treating rubber footwear which consists in placing the same in a vulcanizing chamber, then admitting a vulcanizing medium to the chamber and presenting the same to the interior and the exterior surfaces of the article, and filtering the moisture from that portion of the said vulcanizing medium which enters the said article immediately prior to such entrance.

3. The method of treating rubber boots which consists in presenting a moist vulcanizing medium to the exterior surface of the boot and freeing a portion of such vulcanizing medium of moisture and presenting the same to the interior surface of the boot.

4. The method of curing rubber boots and shoes, which consists in placing the boot or shoe on a last, then immersing the open end thereof and the adjacent portion of the last in a filter of powdered soapstone, then placing the boot or shoe and filter in a vulcanizing chamber, and then admitting steam to the chamber and vulcanizing.

5. In a vulcanizing device the combination with a last rack and means for holding and positioning lasts thereon, and a cup having devices for engaging the said positioning and holding means, and constructed and adapted for receiving within its chamber the end of a last and for holding a filtering medium against the last and a boot or shoe thereon.

6. A device for keeping dry the linings of rubber boots and shoes during steam vulcanization thereof, comprising means for holding a moisture filter at the open end of the boot or shoe.

7. A device for keeping dry the linings of rubber boots and shoes during steam vulcanization thereof, comprising moisture filtering material, and a holder for maintaining the same at the open end of the boot or shoe.

8. A device for keeping dry the linings of rubber boots and shoes during steam vulcanization thereof, comprising a body of powdered soapstone and a holder for maintaining the same at the open end of the boot or shoe.

9. The combination with a last, of a body of powdered soapstone, and a holder for maintaining the said body of powdered soapstone in a position to envelop a portion of the last and the portion of the article upon such portion of the last.

10. The combination with a last for a rubber boot, and a filter for permitting the entrance of the vulcanizing medium between the last and a boot thereon and preventing the entrance of moisture therewith.

In witness whereof, I have hereunto signed my name in the presence of two subscribing witnesses.

JOHN T. CROWLEY.

Witnesses:
J. U. FERRIS,
R. L. FISHER.